United States Patent
Bera

(10) Patent No.: US 12,315,052 B2
(45) Date of Patent: May 27, 2025

(54) GENERATION OF CONTEXT-AWARE WORD EMBEDDING VECTORS FOR GIVEN SEMANTIC PROPERTIES OF A WORD USING FEW TEXTS

(71) Applicant: Accenture Global Solutions Limited, Dublin (IE)

(72) Inventor: Anup Bera, Greater Noida West (IN)

(73) Assignee: Accenture Global Solutions Limited, Dublin (IE)

( * ) Notice: Subject to any disclaimer, the term of this patent is extended or adjusted under 35 U.S.C. 154(b) by 383 days.

(21) Appl. No.: 18/066,613

(22) Filed: Dec. 15, 2022

(65) Prior Publication Data

US 2024/0203003 A1  Jun. 20, 2024

(51) Int. Cl.
  *G06F 40/20* (2020.01)
  *G06F 40/284* (2020.01)
  *G06F 40/30* (2020.01)
  *G06F 40/40* (2020.01)
  *G06T 11/60* (2006.01)

(52) U.S. Cl.
  CPC ............ *G06T 11/60* (2013.01); *G06F 40/284* (2020.01); *G06F 40/30* (2020.01); *G06F 40/40* (2020.01)

(58) Field of Classification Search
  CPC .......... G06F 40/20; G06F 40/30; G06F 40/35; G10L 15/22
  See application file for complete search history.

(56) References Cited

U.S. PATENT DOCUMENTS

| | | | |
|---|---|---|---|
| 10,713,821 B1* | 7/2020 | Surya | G06N 3/045 |
| 11,436,414 B2* | 9/2022 | Cai | G06F 40/205 |
| 11,983,208 B2* | 5/2024 | Osuala | G06N 3/045 |
| 2022/0222435 A1* | 7/2022 | Lin | G06F 40/30 |
| 2023/0139397 A1* | 5/2023 | Zhong | G06F 40/35 |
| | | | 704/9 |
| 2023/0177275 A1* | 6/2023 | Lam | G06F 40/30 |
| | | | 704/9 |
| 2024/0037347 A1* | 2/2024 | Lee | G06F 40/47 |

* cited by examiner

*Primary Examiner* — Daniel Abebe
(74) *Attorney, Agent, or Firm* — Polsinelli PC

(57) ABSTRACT

This disclosure describes example implementations for generating context-dependent embedding vectors of words in the multi-dimensional embedding space based on a generic and non-domain-specific pretrained word embeddings. Such an implementation requires no domain specific training corpus and is capable of generating context-dependent embedding vectors of multi-semantic words using a few contextual texts. Such an implementation thus provides an efficient way to generate a library of multiple domain specific embedding vectors for multi-semantic words without any domain-specific training process. Other example embodiments further apply the principles of the context-dependent word embedding generation to a text-to-image application.

20 Claims, 4 Drawing Sheets

GENERATION OF CONTEXT-AWARE WORD EMBEDDING VECTORS FOR GIVEN SEMANTIC PROPERTIES OF A WORD USING FEW TEXTS

BACKGROUND

Technical Field

This application relates generally to natural language representation and processing, and is particularly directed to generation of multiple context-aware representations of words in a multi-dimensional embedding space.

Background Technologies

Natural language processing (NLP) is generally performed in an embedding space, where texts at different levels (e.g., words, sentences, paragraphs, passages, and the like) are represented by multi-dimensional vectors. These multi-dimensional vectors are processed in the embedding space in order for a machine to understand a textual input. Semantics or meaning of a word, a phrase or other linguistic unit in any natural language is usually contextual. In other words, a linguistic unit in a language is generally associated with multiple semantics/meanings and a particularly meaning it carries in a specific sentence or expression depends on other words in the sentence or expression as a context. Thus, representing a word or phrase as a single vector in the embedding space may not be sufficiently effective in capturing the various contextual-dependent semantics.

BRIEF SUMMARY

This application relates generally to natural language representation and processing, and is particularly directed to generation of multiple context-aware representations of a word in a multi-dimensional embedding space. Such context-dependent representations of words are used in various natural language processing (NLP) tasks, including but not limited to generation of visual images from texts that appear realistic and follow natural principles.

In some example implementations, an automatic context-aware embedding generation system is disclosed. The automatic context-aware embedding generation system may include a pretrained context-aware natural language processing (NLP) circuitry for generating a sentence-level embedding vector of a textual input expression in a multi-dimensional embedding space. The pretrained context-aware NLP circuitry may include a neural network having at least one hidden layer. The system may further include a context-aware embedding generator circuitry at a word-level; and a datastore for context-aware word-level embedding vectors. The context-aware embedding generator circuitry may be configured to receive the textual input expression and request the pretrained context-aware NLP circuitry to process the textual input expression. The pretrained context-aware NLP circuitry may be configured to automatically parse the textual input expression into a plurality of input tokens, to automatically generate context-aware information items in the at least one hidden layer corresponding to the plurality of input tokens, and to automatically generate a sentence-level embedding vector of the input textual expression in the multi-dimensional embedding space. The context-aware embedding generator circuitry may be further configured to automatically aggregate the context-aware information items from the at least one hidden layer to derive a set of word-level context-aware embedding vectors in the multi-dimensional embedding space for the plurality of input tokens, and to store the set of word-level context-aware embedding vectors in the multi-dimensional embedding space for the plurality of input tokens in the datastore, wherein at least one word in the datastore is associated with two or more word-level context-aware embedding vectors.

In some other example implementations, a text to image generation system is disclosed. The system may include a memory for storing computer instructions; a display screen; and a processor in communication with the memory and the display screen. The processor may be configured to execute the computer instructions from the memory to receive a textual expression; automatically parse the textual expression into a subject token and a property token; automatically generate from the property token a property embedding vector in a multi-dimensional embedding space; automatically generate a textual paragraph comprising a plurality of sentences based on the subject token; automatically obtain, from the plurality of sentences using a context-aware embedding generator, a plurality of embedding-vector-property-token pairs. Each of the plurality of embedding-vector-property-token pairs may include a context-aware embedding vector of the subject token in the multi-dimensional embedding space representing a contextual semantics of the subject token within one of the plurality of sentences; and a property word associated with the context-aware embedding vector of the subject token in a context of a corresponding sentence of the plurality of sentences. The processor may be further configured to execute the computer instructions to automatically generate a realism measure of the textual expression based on the plurality of embedding-vector-property-token pairs and the property embedding vector of the property token; when the realism measure is above a predefined threshold level, automatically generate a visual image from the textual expression; and display the visual image on the display screen.

DETAILED DESCRIPTION

Figure 1:
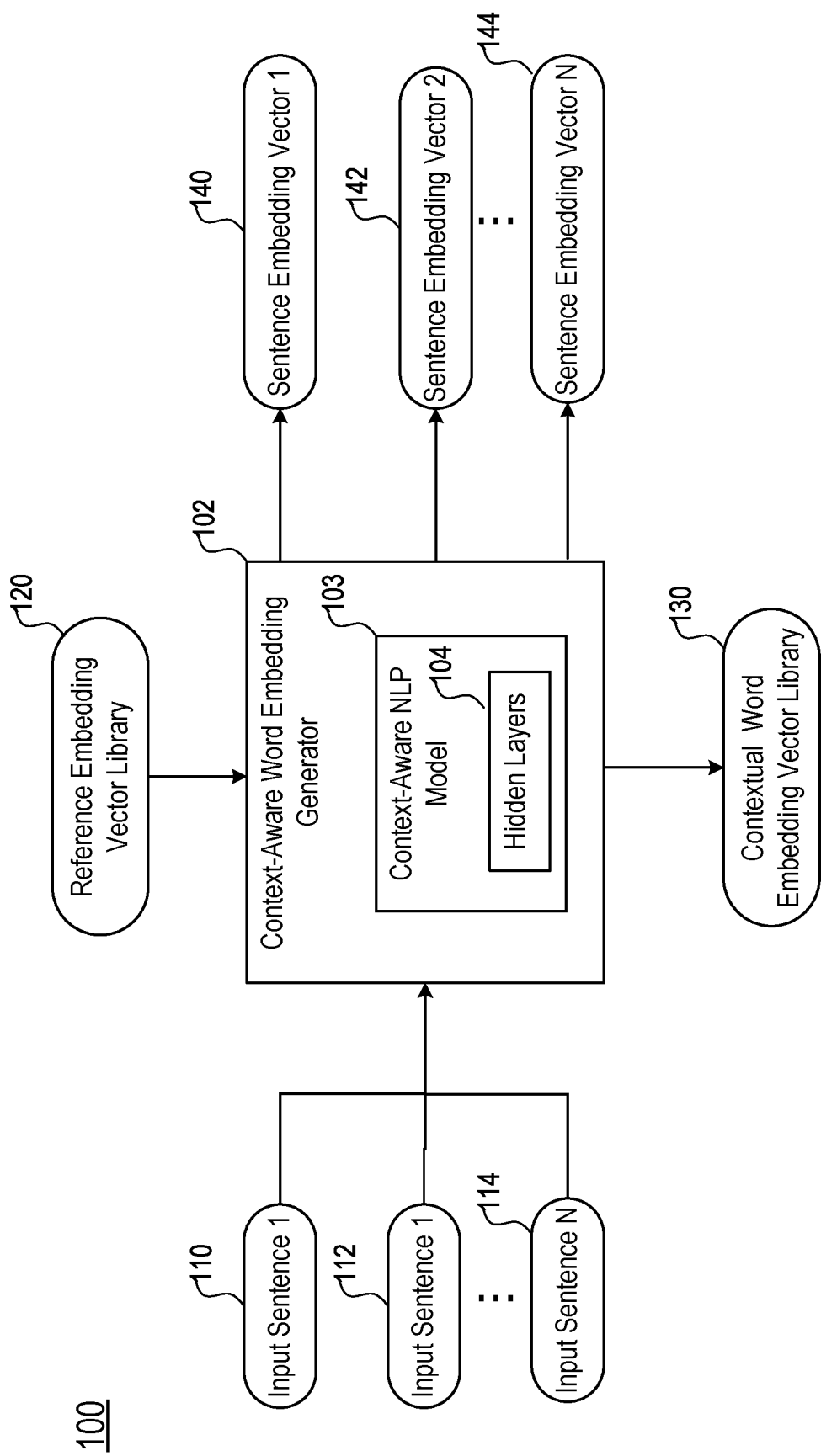
FIG. 1 illustrates a data and logic flow in an example NLP system and method for generating context-aware word embedding vectors.

This system will now be described in detail hereinafter with reference to the accompanied drawings, which form a part of the present disclosure, and which show, by way of illustration, various example implementations and embodiments. The system may, however, be embodied in a variety of different forms and, therefore, the disclosure herein is intended to be construed as not being limited to the embodiments set forth. Further, the disclosure may be embodied as methods, devices, components, systems, and/or platforms.

Accordingly, embodiments of the disclosure may, for example, take the form of hardware, software, firmware or any combination thereof.

In general, terminology may be understood at least in part from usage in its context. For example, terms, such as "and", "or", or "and/or," as used herein may include a variety of meanings that may depend at least in part upon the context in which such terms are used. Typically, the term "or", if used to associate a list, such as A, B or C, is intended to mean A, B, and C, here used in the inclusive sense, as well as A, B or C, here used in the exclusive sense. In addition, the term "one or more" or "at least one" as used herein, depending at least in part upon context, may be used to describe any feature, structure, or characteristic in a singular sense or may be used to describe combinations of features, structures or characteristics in a plural sense. Similarly, terms, such as "a", "an", or "the", again, may be understood to convey a singular usage or to convey a plural usage, depending at least in part upon context. In addition, the term "based on" or "determined by" may be understood as not necessarily intended to convey an exclusive set of factors and may, instead, allow for the existence of additional factors not necessarily expressly described, again, depending at least in part on context.

By way of introduction, in most languages, if not all, a single word usually carries multiple semantic information depending upon its context or a domain in which it is used. In the English language, for example, the word "bank" has different meanings depending upon its usage. When it is used in a sentence which related a financial domain, it has one meaning and when it is used in the context of a scene of nature (e.g., river bank), it has another different meaning. In some other more subtler situations, a word may point to a same semantic meaning in different contexts, but with different aspects or property of that meaning being invoked. For example, English words "king" and "queen" each may semantically refer to a person, but their use in one context may focus on a "ruler" aspect of these words (e.g., in the example text of "a king is the ruler of his kingdom"), or on a "royal" aspect of these words in another context (e.g., in the example text of "the King family greeted a visiting foreign delegation"), or on a "gender" aspect in yet another context (e.g., in the example text of "the gender of the king is male").

Natural language processing (NLP) by computing machines for understanding semantics of an input text of a language may be generally performed in a multi-dimensional embedding space, where texts at different levels (e.g., words, sentences, paragraphs, passages, and the like) are represented by vectors in the multi-dimensional embedding space, with the various dimensions trained and linked to certain semantic or other features. These multi-dimensional vectors are processed in the embedding space in order for a machine to understand the semantics any textual input expression.

Traditional NLP may involve a pretrained model representing the multi-dimensional embedding space in which each word in a corpus of words corresponds to a trained multi-dimensional embedding vector in the multi-dimensional embedding space. An example of such NLP model includes the word2vec model, which may be trained on a large corpus of texts and may be capable of converting an input word into its corresponding trained embedding vector.

In these traditional models, each word can only be associated with a single embedding vector in the trained multi-dimensional embedding space. As a result, such models cannot be context dependent. In other words, these models are not capable of differentiating context-dependent semantics. In these models, the trained embedding vector for a particular word with multiple context-dependent semantics contains all semantic information of the particular word extracted from the training corpus texts in the various dimensions of the multi-dimensional embedding space. The various properties of a word may not be easily ascertained from such models. For applications that may be developed based on such models, it would be very difficult to ascertain the intended semantics of a word having multiple context-dependent semantics from its single embedding vector alone.

For many specific applications based on machine learning and NLP, however, it may be crucial to ascertain these context-dependent properties. These applications include but are not limited to, for example, literature understanding, language generation using keywords, word or text to image generation, automatic knowledge graph creation, semantic word extraction, gender bias detection, and the like.

In some implementations, domain-specific word embedding models rather than a general model may be trained. Because the semantics of a word in a particular domain may be limited (ideally there is only one domain-specific meaning), such models may be trained using domain-specific training text corpus in order to generate embedding vectors that are more focused on the specific semantics of the words. However, such a model would only have narrow applicability and would be largely useless in a different domain. Many separate domain-specific training text corpuses may need to be prepared for training separate domain-specific embedding models in order for an application to more accurately and effectively handle tasks that are not domain-specific.

However, in some situations, it may not be possible or it may be very difficult to collect training texts that are exclusive in certain domains. General corpus of texts for training purposes are almost always somewhat mixed in semantics for many words. In other words, clean domain specific training corpus may not be easily obtainable in sufficient amount of any particular domain.

In addition, the training of domain specific word embedding models may require a large textual training corpus in each of the domain. However, textual corpus available for training purposes for many domains may be too small to effectuate any useful training.

As such, it may be desirable to develop a generic rather than domain-specific word embedding model that is nevertheless capable of recognizing semantic meaning of a multi-semantics word in an input text according to a context of that word in the input text (e.g., other words in the input text that surround the multi-semantics word), and yet does not require domain specific training corpus.

The various embodiments below describe example implementations for generating context-dependent embedding vectors of words in the multi-dimensional embedding space based on a generic and non-domain-specific pretrained word embedding model. Such an implementation requires no domain-specific training corpus and is capable of generating context-dependent or context-aware embedding vectors of multi-semantic words using a few contextual texts. The implementation takes advantage of and aggregates other generic context-aware embedding models at sentence level or above to derive context-aware word embedding vectors in the multi-dimensional embedding space. Such an implementation thus provides an efficient way to generate a library of multiple domain specific embedding vectors for multi-semantic words without any domain-specific training process.

Other example embodiments below further apply the principles of the context-dependent or context-aware word embedding generation to a text-to-image application.

In some example implementations, a context-aware NLP model at sentence level or above (e.g., passage level) may be constructed using multilayer neural network. The context-aware NLP model may be built on top of a pretrained generic word embeddings model, such as the word2vec model. The generic word embedding model may be pretrained using generic textual corpus to define a multi-dimensional embedding space. The generic word embedding model may contain trained model parameters that deterministically generate a single embedding vector for each input word. Such generic pretrained word embedding model may be referred to as a base word embedding model, or a reference word embedding model. A unique reference embedding vector may be determined for a particular word by the base word embedding model.

The context-aware NLP model may further contain a parser configured to parse an input textual expression, e.g., a sentence, into tokens (e.g., words or phrases, or portion of words when those words contains semantically significant parts, such as prefixes and other word components). For simplicity of description, the term "token", "words", and "phrases" may be used interchangeably below.

The tokens generated by the parser from the input sentence may then be processed by the generic word embedding model to generate a set of embedding vectors in the multi-dimensional embedding space where each embedding vector corresponding to one of the parsed tokens.

The context-aware NLP model may further include various hidden layers on top of the generic word embedding model such that these hidden layers perform, for example, linear mixing of the embedding vectors of the token, and nonlinear activation of the mixed embedding vectors, to generate a set of feature information for each of the tokens. The feature information for each of the token would now be based on the original reference embedding vector of the token as generated from the base word embedding model and at the same time would be mixed in with the embedding vectors of other tokens in the input sentence as a context. The feature information for each of the token thus now contains its context information as embedded in the input sentence.

The last hidden layer of context-aware NLP model may then be connected to an output which represent an output embedding vector for the input sentence in the multi-dimensional embedding space. The output embedding vector is intended, for example, to represent an overall semantic meaning of the input sentence.

The various model parameters associated with the connections, weights, activation, and other parameters associated with the various hidden layer and the output layer of the context-aware NLP model may be determined via a training process. In some implementations, the base word embedding model above, instead of being separately trained, may be trained jointly with the context-aware NLP mode. The trained context-aware NLP model may then be used to process any input sentences to generate an output embedding vector for the input sentence, and very important, to generate context-aware feature information for the constituent tokens or words in the sentence. The same word or token in different sentences may carry different semantics. The context-aware NLP model is built and trained in such a manner that it would generate different feature information for a same word or token when processing different sentences containing the same token or words but having different context.

Other architectural level consideration may be included in building and training the context-aware NLP model above. Such a context-aware NLP model may be established based on the Bidirectional Encoder Representations from Transformers (BERT) technique. A context-aware NLP model, for example, may operate bidirectionally with respect to the sequence of words in the input sentence in order to capture contextual information in both directions, and may include a multi-head attention mechanism for capturing the contextual information.

In some implementations, a particular context-aware NLP model at the sentence level or above may be used to generate context-aware word embedding vectors. Specifically, the contextual word feature information contained in the hidden layers may be processed and extracted to generate embedding vectors of the constituent tokens or words of an input sentence. Because different sentences containing a same word have different context, multiple context-dependent embedding vectors for the same text may be generated by processing the multiple sentences using the context-NLP model.

Further, one or multiple context-aware NLP models may be used for generating a library of multi-context word embedding vectors. In one example, several separately developed context-aware NLP models may be used to process a same sentence to extract context-dependent embedding vectors for the word. Each of these NLP models may produce one context-dependent vector for the particular word. The context-dependent vectors for the word from these NLP models, for example, may be combined (e.g., averaged) to generate a final context-dependent embedding vector for the word in the context of that input sentence.

Such a context-aware NLP model in combination with logic operations to generate context-aware embedding vectors for tokens or words of the input sentence from the feature information in the various hidden layers is illustrated is schematically as a context-aware embedding generator 102 in FIG. 1. The context-aware word Embedding Generator 102, as described above, may be based on a context-aware NLP model 103. The various hidden layers of the context-aware NLP model 103 are illustrated as component 104 within the context-aware NLP model 103.

As an example, the below algorithm illustrates an extraction of information from hidden layers of a pretrained context-aware NLP embedding model 103 to generate context-dependent embedding vectors for words "king" and/or "queen" given two sentences, sentence 1 and sentence 2, having both the words "king" and "queen". Assume that Sentence 1="king and queen live in royal palace and King is a part of royal family and also queen is a part of royal family" and that Sentence 2="king is a male monarch and queen is female equivalent of king." When sentence 1 is input to the context-aware NLP model, its internal layers generate embedding vector of each word. The final embedding vector of each word may be generated by summing up or concatenating of last few layers word embedding vectors. These final embedding vectors carry contextual information of the words. As both the words "king" and "queen" carry royal family background context according to Sentence 1. The cosine similarity of both the vectors of "king" and "queen" should be highly correlated.

Similarly, if sentence 2 is input into the context-aware NLP embedding model 103, the final embedding vectors of the words "king" and "queen" would carry opposite gender contextual information according to sentence 2. As such, the cosine similarity between the embedding vectors of these two words should give a negative correlation.

FIG. 1 further shows an example implementation 100 for generating context-aware embedding vectors in the multi-dimensional embedding space for a particular word using the context-aware word embedding generator 102 based on the context-aware NLP model 103. As shown in FIG. 1, the input to the context-aware embedding generator 102 are a plurality of input sentences 110, 112, and 114. These input sentences may be constructed to include the same particular word but represent different semantics of the same word. In some implementations, these sentences may be separately or sequentially input into the context-aware embedding generator 102.

As described above, the context-aware NLP model 103 parses each of the input sentences 110, 112, and 114 into their constituent words or tokens. The context-aware NLP model 103 further retrieves reference embedding vectors associated with the constituent words or tokens as either generated on demand from the base word embedding model or pre-stored in a reference embedding vector library 120. For each of the input sentences, the corresponding reference embedding vectors may then be processed through the various network elements including the hidden layers 104 of the context-aware NLP model 103. The various context-aware feature information of the constituent tokens or words may then be extracted by the context-aware word embedding generator 102 using, for example, the extraction process as reflected by the example code above, to generate the context-aware embedding vectors of the particular word and store such contextual-ware embedding vectors of the particular word in a contextual word embedding vector library 130. Because each of the input sentences 110, 112, and 114 include different context for the particular word under its different semantics meaning, the corresponding context-aware embedding vectors for the particular word as generated based on the different input sentences likely differ. In some example implementations, the context-aware NLP model 103 may further generate output overall embedding vectors 140, 142, and 144 in the multi-dimensional embedding space for the input sentences 110, 112, and 114, respectively.

As such, in the example implementation 100 of FIG. 1, multiple context-aware embedding vectors of a word may be generated based on a generic and non-domain-specific base word embedding model without domain-specific training data. Using such an approach, a library of context-dependent or context-aware embedding vectors of words may be easily established with significantly reduced amount of input datasets.

In FIG. 1, one context-aware NLP model 103 is shown as being used. In some other example implementations, multiple context-aware NLP models may be used to process the input sentences. For example, different sentences may be processed by different context-aware NLP models. Alternatively, a same sentence may be processed by multiple context-aware NLP models. In that case, the word embedding vectors so generated for a particular context of the same sentence may be aggregated by average (either weighted or unweighted) or other manner to generate a word embedding for that context.

The input sentences 110, 112, and 114 for a particular word may be constructed based on the various semantics or properties of the word being of interest. For example, for an example word "king", the various input sentences may be constructed as (1) "king and queen live in royal palace and King is a part of royal family and also queen is a part of royal family" (for the "royal family" semantics or property of the word "king"), (2) "king is a male monarch and queen is female equivalent of king" (for the "gender" property or semantics of the word "king"), (3) "the king ruled this country" (for the "ruler" property or semantics of the word "king"), and (4) "he is the king of Jazz" (for the "top talent" property or semantics of the word "king").

Correspondingly, the context-aware embedding vectors generated for the word "king" would reflect the context in each of the input sentences. For example, the embedding vector of the word "king" as generated according to the sentence (1) above may reflect the "royal family" property of this word. As such, such context-aware embedding vector may have a relatively small distance with words such as "royal" in the multi-dimensional embedding space. Further, the embedding vector that may be generated for the word "king" and "queen" in such a context may have small distance between them in the multi-dimensional embedding space. Such distance may be measure, for example, as a cosine similarity between points occupied by the embedding vectors in the multi-dimensional embedding space. A small distance may correspond high cosine similarity. The cosine similarity may be a normalized measure between, for example 0 (no similarity) and 1 (highly similar).

For another example, the embedding vector of the word "king" as generated according to the sentence (2) above may reflect the "male" property of this word. As such, such context-aware embedding vector may have a relatively small distance with words such as "male" and "man" in the multi-dimensional embedding space. Further, the embedding vector that may be generated for the word "king" and "queen" in such a context may have a large distance (or small cosine similarity) between them in the multi-dimensional embedding space because they represent opposite genders.

Likewise, the embedding vector of the word "king" as generated according to the sentence (3) above may reflect the "ruler" property of this word. As such, such context-aware embedding vector may have a relatively small distance (or large cosine similarity) with words such as "ruler", "monarchy" and "dictator" in the multi-dimensional embedding space. Finally, the embedding vector of the word "king" as generated according to the sentence (4) above may reflect the "top talent" property of this word. As such, such context-aware embedding vector may have a relatively small distance (or large cosine similarity) with words such as "expert" and "talented" in the multi-dimensional embedding space.

In some other example implementations, the underlying principles above may be applied to generate context-ware embedding vectors at levels higher than the word level. For example, this approach may be extended to context-aware key-phrase embedding vector generation.

The principles underlying the generation of context-aware embedding vectors for words may be used as building blocks for various applications including but not limited to literature understanding, language generation using keywords, word or text to image generation, automatic knowledge graph creation, semantic word extraction, gender bias detection, and the like. The several implementations below are illustrates as examples for applying such context-aware or context-dependent embedding vector generation in text-to-image applications.

While the description below focuses on text-to-image generation, the underlying principles also apply to text-to-video generation. In such applications, a text-to-image model may be used to analyze and understand an input textual expression (e.g. a sentence) and automatically generate a visual image depicting the textual expression from a library of images, portions/segments of images in the image library, and/or dynamical generated image segments.

With the advancement of various technologies underlying text-to-image generation, it may be expected that a given text should be realistically meaningful in order to generate naturally appearing images. As such, a text-to-image generation process may be further configured to discriminate against input texts that depict unrealistic visual scenes or contents. For example, an image generated according to a text "tiger is flying in the sky" would not look realistic. As such, in order to generate a natural image, it may be desired that the input text first be validated before an image is generated. Without such validation, a text-to-image generation process that uses deep learning model trained on input datasets which consist of images and its corresponding captions would generate an output as a combination and permutation of images and sub-images that may not resemble or may violate reality or natural principles. In the example text of "tiger is flying in the sky" above, a text-to-image generator without reality validation would generate an image with a flying tiger even though such an output image would appear unnatural and unrealistic.

In some example implementations, the context-dependent or context-aware embedding vector generation mechanism described above for words within the input text may be used in text-to-image application in one or both of at least two aspects. In a first aspect, the context-aware embedding vectors so generated may be used to perform the validity verification of the input text as described above before the image is generated. In a second aspect, the context-aware embedding vectors so generated may be used as part of the basis for the generation of the image after the validity verification.

With respect to the validity verification aspect, an input text for image generation may contains a subject token (e.g., "tiger") and a property token (e.g., "fly" or "fly in the sky"). Each of these subject tokens may have different semantic meanings under different context, as described above. Each of the semantic meanings of a subject token may be associated with a set of properties. These properties may be divided into groups or categories, e.g., intrinsic property group and actionable property group. For example, the subject word or token "tiger" in its semantic meaning as an animal may be associated with the following intrinsic properties (1) four legs, (2) two eyes, (3) a tail, (4) cylindrical body shape, etc., and actionable properties (1) running, (2) hunting, (3) chasing, (4) laying, (5) roaring, (6) living in jungle, etc. When any text-to-image model tries to auto generate a realistic and naturally-appearing image, it should adhere to the basic elementary properties of the subject token and should not violet known natural principles and rules.

Figure 2:
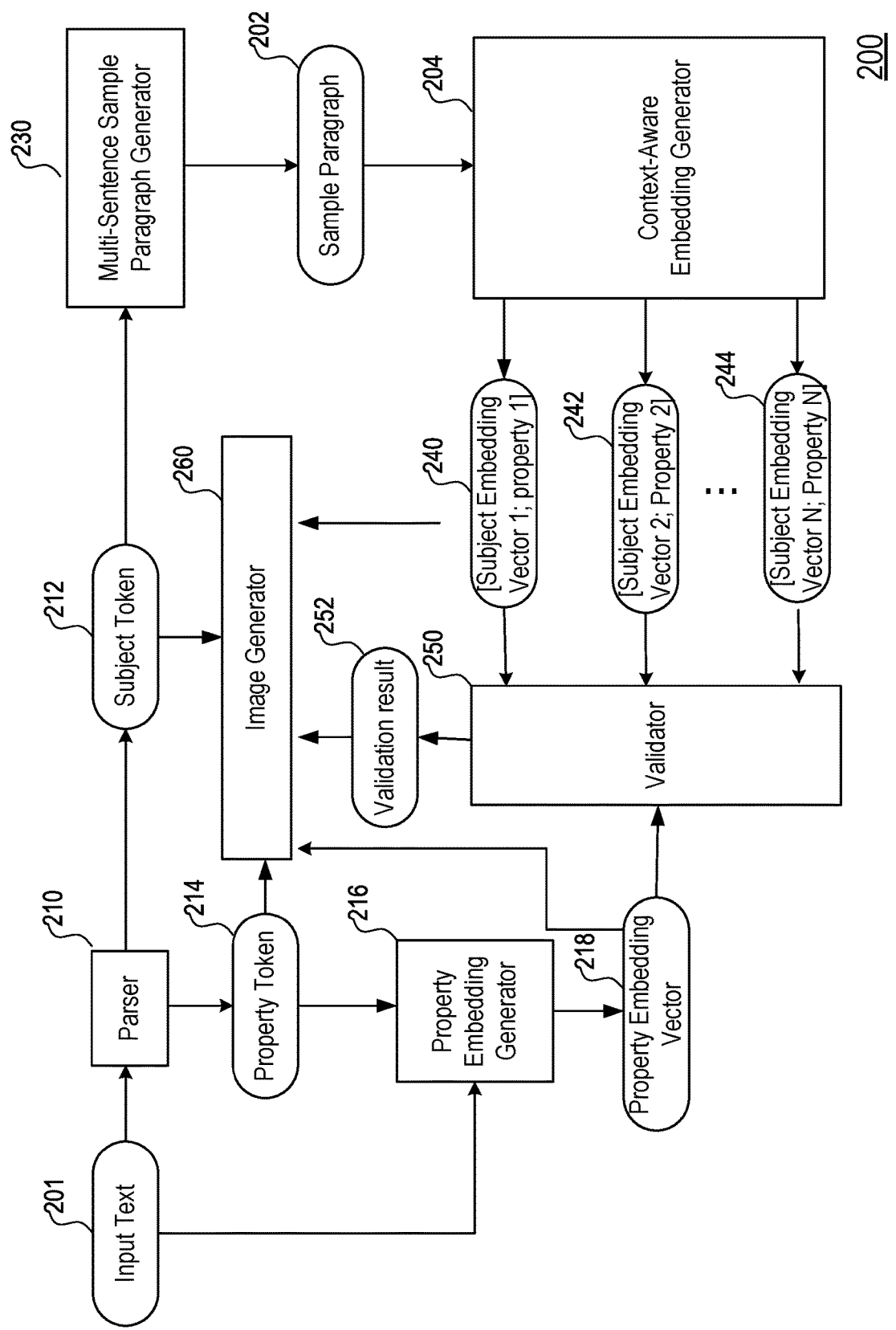
FIG. 2 illustrates a data and logic flow in an example NLP system and method for intelligent and automatic text-to-image generation.

An example implementation for natural/realistic text-to-image generation is illustrated by the data and logic flow of a text-to-image generator 200 in FIG. 2.

As shown in FIG. 2, the text-to-image generator 200 may include a parser 210 for parsing an input text 201 into tokens, including but not limited to a subject token 212 (e.g., "tiger" in the example above) and a property token 214 (either intrinsic or actionable, e.g., "flying" or "flying in the sky" in the example above). The subject token may then be used by a multi-sentence sample paragraph generator 230 to automatically generate a sample paragraph 202 containing one or more sentences associated with the subject token. The sample paragraph generator 230, for example, may be based on retrieving sentences associated with the subject token from dictionary corpuses or other text sources or knowledgebases such as Wikipedia™. In some other implementations, the sample paragraph generator 230 may itself be constructed as, for example, a separate neural network.

The sentences in the sample paragraph 202 as generated by the sample paragraph generator 230 may reflect the various intrinsic and actionable properties described above. For example, a sample paragraph for the subject token "tiger" may be: "A tiger has a large and strong body with brown fur and black stripes. It has four legs, a large head, a long striped tail and a pair of glowing, ferocious eyes. Tigers live in jungles. Tigers chase small animals for food."

As further shown in FIG. 2, the sample paragraph 202 may then be processed by the context-aware embedding generator 204 (as described above in relation to the context-aware embedding generator 102 of FIG. 1), in a sentence by sentence manner, to generate context-aware embedding vectors of the subject token. Because each sentence may be associated with one or more properties, the output from the context-aware embedding generator 204 may form a plurality of pairs of subject embedding vectors and properties, shown as 240, 242, and 244. Each pair, for example, may contain a subject embedding vector and a property with its embedding vector. The subject embedding vectors of the pairs 240, 242, and 244 are context dependent by nature of the operation of the context-aware embedding generator 204 as described above.

As shown in FIG. 2, the text-to-image generator 200 may further include a validator 250 for determining whether the input text 201 reflects reality and comply with natural principles. The input to the validator 250 may include but is not limited to the plurality of pairs of subject embedding vectors and properties, shown as 240, 242, and 244, and a property embedding vector 218 derived from the input text. The validator 250 may be configured to process such input and determine a validation result 252. In some example implementations, the validation result 252 may be a binary value for indicating whether the input text 201 is realistic or not. In some other implementations, the validation result 252 may be a value for quantifying a degree of realism of the input text 201. An example implementation of the validator 250 is provided in further detail in relation to FIG. 3.

The property embedding vector 218 as an input to the validator 250 may be generated from the property token 214 of the input text 201 using a property embedding generator 216. For example, the property embedding generator 216 may be implemented as the generic word embedding model (such as word2vec) described above, or implemented in other alternative manner. For example, the property embedding generator 216 may be implemented similarly to the context-aware embedding generator 204. The input to the property embedding generator 216 so implemented may then be the input text 201 as a sentence and the property embedding vector 218 would then be generated as a context-aware embedding vector for the property token 214.

Finally, as shown in FIG. 2, the text-to-image generator 200 may include an image generator 260 for generating an output image according to the input text 201 using an automatic text-to-image generation model, when the validator 250 determines that the input text 201 complies with reality and natural principles. The input to the image generator 260 may include any combination of information including but not limited to the validation result 252, the plurality of pairs of subject embedding vectors and properties 240, 242, and 244, the property token 214, the subject token 212, and the property embedding vector 218. In some other implementations, the input to the image generator 260 may further include the original input text 201. The image generator may be based on a pretrained text-to-image generation model. The pretrained text-to-image generation model may include, for example, a multilayer neural network.

Figure 3:
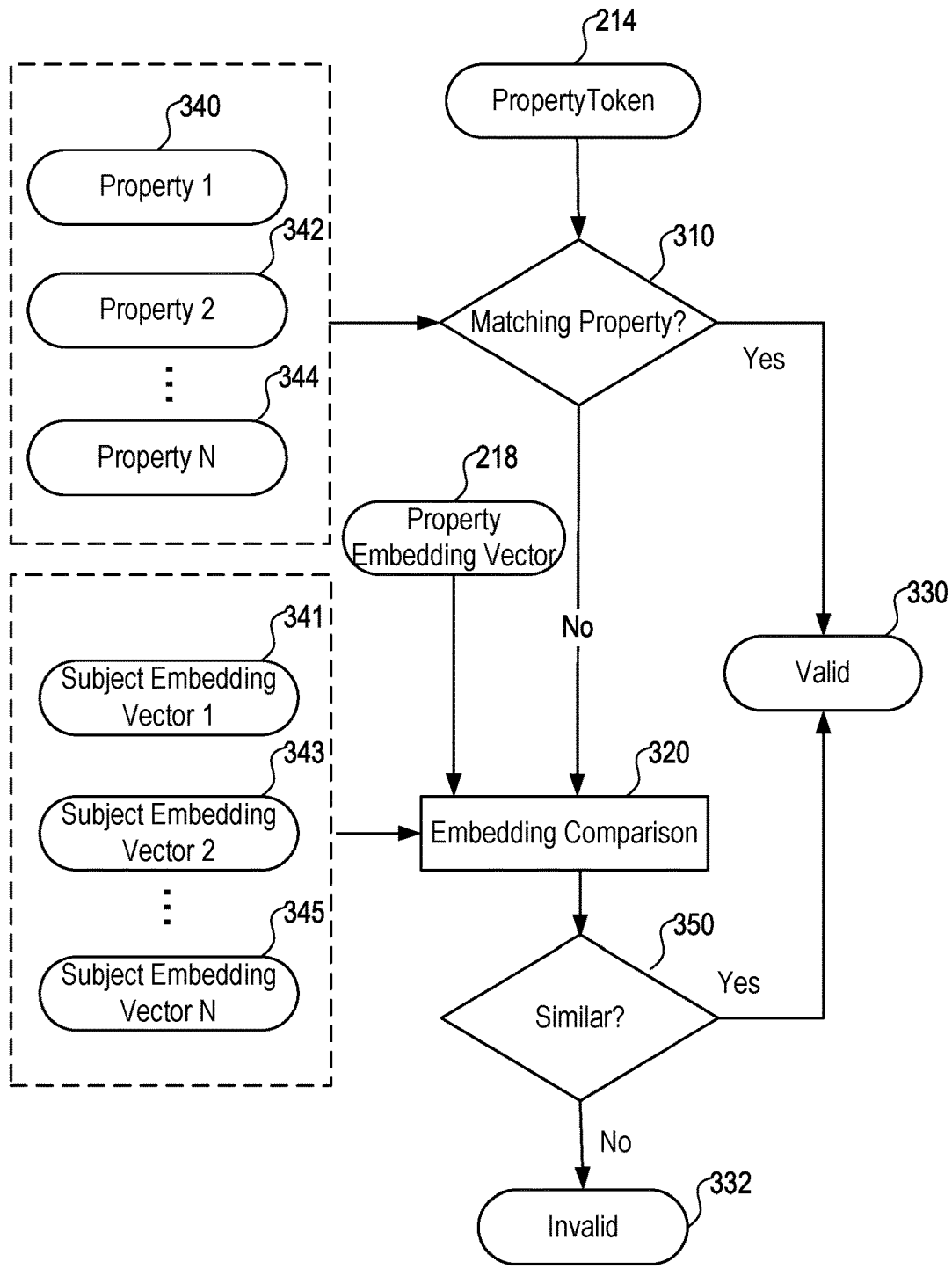
FIG. 3 illustrates a data and logic flow in an example NLP system and method for intelligently and automatically determining whether a textual expression is realistic or complies with natural principles prior to an automatic image creation from the textual expression.

FIG. 3 further illustrates a data and logic flow for an example implementation of the validator 250 of FIG. 2. As shown by 310 in FIG. 3, the validator 250 may first compare the property token 214 as extracted from the input text with the various properties 340, 342, and 344 as included in the plurality of pairs of subject embedding vectors and properties 240, 242, and 244 of FIG. 2, to determine whether there is a property match. The validator 250 may determine that the input text is valid for text-to-image generation (330) if there is a match (e.g., the property token matches at least one of the properties 340, 342, and 344.

If the validator 250 in the property matching process 310 determines that there is no match between the property token 214 extracted from the input text and the properties 340, 342, and 344, then the validator 250 may further perform an embedding comparison 320 between the property embedding vector 218 of the property token 214 as extracted from the input text and the various subject embedding vectors 341, 343, and 345 in the plurality of pairs of subject embedding vectors and properties 240, 242, and 244 of FIG. 2. Such comparison may be performed in the multi-dimensional embedding space as, for example, a distance or similarity analysis. The similarity analysis, for example, may be conducted using cosine similarity. The idea of the embedding comparison 320 is to determine a similarity measure between the embedding vector of the property token and multi-contextual embeddings of the subject token as derived by the context-aware embedding generator 204 of FIG. 2 from the sample paragraph 202 of FIG. 2.

The validator 250 may then determine in 350 whether there is an embedding match by similarity at 250. A determination of sufficient similarity would suggest that the property token in the input text is realistically compatible with the subject token in the input text, and the validator thus would consider the input text realistic and valid (330), and permit the text-to-image generator to proceed with the image generation in 260 of FIG. 2. Otherwise, the validator 250 would consider the input text invalid (332) and prevent the text-to-image generator from proceeding with the image generation in 260 of FIG. 2.

The similarity comparison and evaluation above associated with the processes 320 and 350 in FIG. 3 may be performed by analyzing the cosine similarities between the property embedding vector 218 and the subject embedding vectors 341, 343, and 345 separately or in aggregation. For example, a similarity between any one of the subject embedding vectors with the property embedding vector may be deemed sufficient for finding similarity. In some implementations, maximum similarity between the subject embedding vectors with the property embedding vector may be considered. Alternatively, the similarity may be determined by an aggregated similarity of all of the subject embedding vectors and the property embedding vector. The similarity determination at 350 may be based on comparing the measured similarity with a predetermined similarity threshold.

The data and logic flow for the validator 250 of FIG. 3 is further explained below using an example input text of "a tiger is chasing a deer." In this example, the input text may be first processed to extract the subject token as "tiger" and the property token as "chase" (for simplicity in explanation, the word "deer" has been ignored). The sample paragraph for the subject token "tiger" may be generated as "A tiger has a large and strong body with brown fur and black stripes. It has four legs, a large head, a long striped tail and a pair of glowing, ferocious eyes. Tigers live in jungles. Tigers chase small animals for food." The context-aware embedding generator may process the sample paragraph to generate the plurality of pairs of subject embedding vectors and properties as:

[Tiger body embedding vector, "body"]
[Tiger leg embedding vector, "legs"]
[Tiger color embedding vector, "color"]
[Tiger living environment embedding vector, "live"]
[Tiger action vector, "chase"]

The validator may then identify that the property token "chase" matches at least one of the properties in the above pairs as generated from the sample paragraph. The validator thus determines that the input text "a tiger is chasing a deer" is valid for text-to-image generation.

However, if the input text is modified to "a tiger is running", then the property token would be extracted as "running" rather than "chasing". The validator would then determine that the property token does not match any of the properties generated from the sample paragraph above. The validator may then proceed to performing embedding comparison. In this case, the embedding vector for the property token "running" may be obtained, and compared to the various contextual tiger embedding vector in the plurality of pairs of subject embedding vectors and properties above as generated by the context-aware embedding generator from the sample paragraph. For example, the validator may determine that the embedding vector associated with the property token "running" is sufficiently similar to the embedding vector of the subject token "tiger" in the context of "chasing" in comparison to a predetermined similarity threshold, and thus may determine that the input text "a tiger is running" is valid for text-to-image generation.

In an opposite example, an input text "a tiger is flying in the sky" would contain a property token of "flying", which would not match any of the properties in the plurality of plurality of pairs of subject embedding vectors and properties above as generated by the context-aware embedding generator from the sample paragraph. Further, the validator may further determine that the embedding vector of the property token "flying" is not similar to any of the embedding vectors of the subject token "tiger" in any of the contexts provided by the sample paragraph above. As such, the validator may determine that the input text "a tiger is flying in the sky" is not realistic and is invalid for text-to-image generation.

Figure 4:
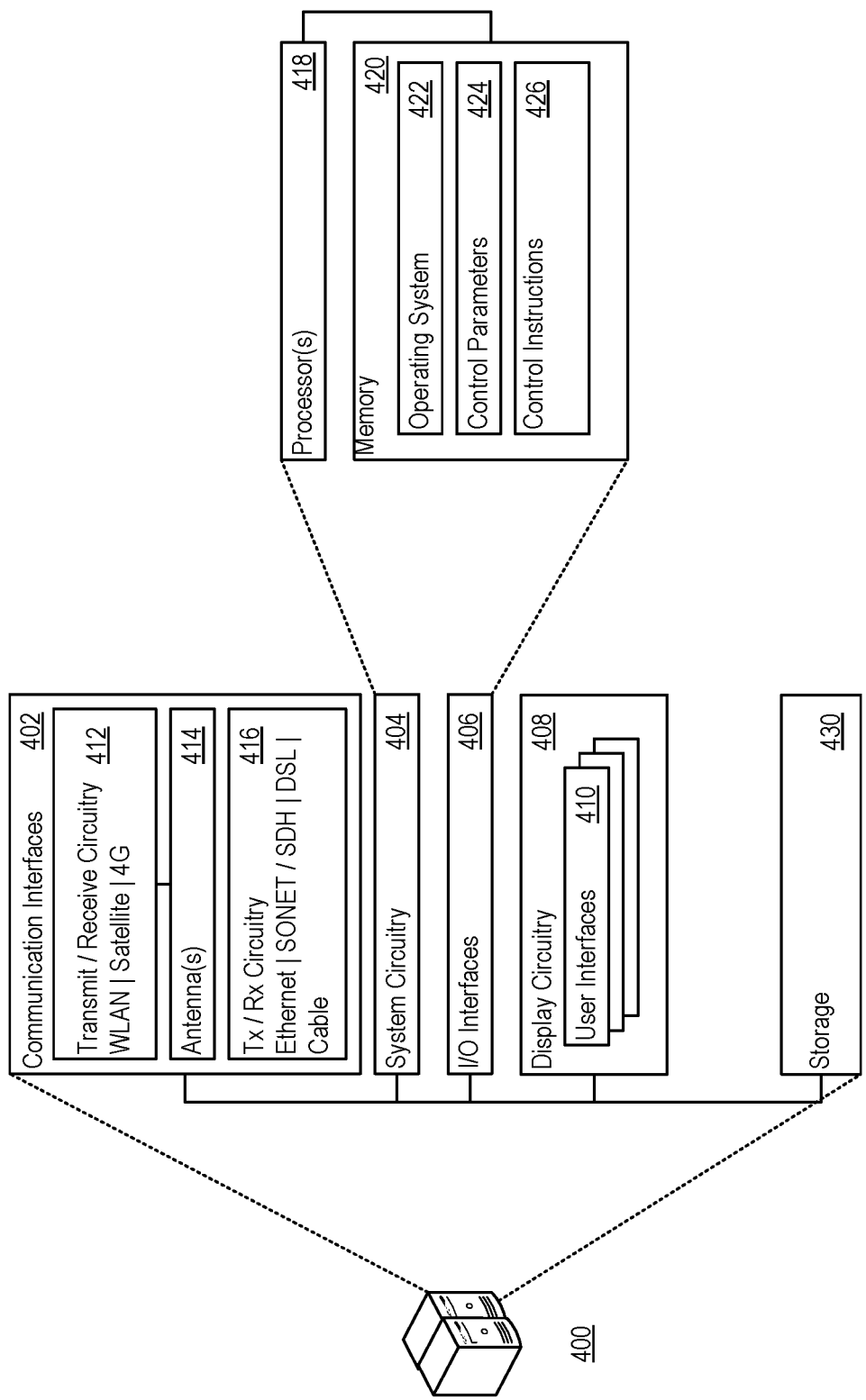
FIG. 4 illustrates an example computing device that may be used to implement various computing components of the example systems and methods above.

Finally, FIG. 4 illustrates an exemplary architecture of a computing device 400 on which the various computing components of the system described above. The computing device 900 may include communication interfaces 402, system circuitry 404, input/output (I/O) interface circuitry 406, and display circuitry 408. The graphical user interfaces (GUIs) 410 displayed by the display circuitry 408 may be used to receive user commands/input and to display various outputs. The GUIs 410 may be displayed locally using the display circuitry 408, or for remote visualization, e.g., as HTML, JavaScript, audio, and video output for a web browser running on a local or remote machine.

The GUIs 410 and the I/O interface circuitry 406 may include touch sensitive displays, voice or facial recognition inputs, buttons, switches, speakers and other user interface elements. Additional examples of the I/O interface circuitry 406 includes microphones, video and still image cameras, headset and microphone input/output jacks, Universal Serial Bus (USB) connectors, memory card slots, and other types of inputs. The I/O interface circuitry 406 may further include magnetic or optical media interfaces (e.g., a CDROM or DVD drive), serial and parallel bus interfaces, and keyboard and mouse interfaces.

The communication interfaces 402 may include wireless transmitters and receivers ("transceivers") 412 and any antennas 414 used by the transmit and receive circuitry of the transceivers 412. The transceivers 412 and antennas 414 may support WiFi network communications, for instance, under any version of IEEE 802.11, e.g., 802.11n or 802.11ac, or other wireless protocols such as Bluetooth, Wi-Fi, WLAN, cellular (4G, LTE/A). The communication interfaces 402 may also include serial interfaces, such as universal serial bus (USB), serial ATA, IEEE 1394, lighting port, $I^2C$, slimBus, or other serial interfaces. The communication interfaces 402 may also include wireline transceivers 416 to support wired communication protocols. The wireline transceivers 416 may provide physical layer interfaces for any of a wide range of communication protocols, such as any type of Ethernet, Gigabit Ethernet, optical networking protocols, data over cable service interface specification (DOCSIS), digital subscriber line (DSL), Synchronous Optical Network (SONET), or other protocol.

The system circuitry 404 may include any combination of hardware, software, firmware, APIs, and/or other circuitry. The system circuitry 404 may be implemented, for example, with one or more systems on a chip (SoC), application specific integrated circuits (ASIC), Central Processing Units (CPUs), Graphical Processing Units (GPUs), microprocessors, discrete analog and digital circuits, and other circuitry. The system circuitry 404 may implement any desired functionality of the disclosed system and its various components. As just one example, the system circuitry 404 may include one or more instruction processor 418 and memory 420. The instruction processors may be one or more CPUs, GPUs, or other type of processors. The various model described above, for example, may be implemented in one or more GPUs.

The memory 420 may be implemented as a non-transitory memory circuit and may store, for example, control instructions 426 for implementing the various functions described above, as well as an operating system 422. In one implementation, the processor 418 executes the control instructions 426 according to control parameters 424 and execute the operating system 422 to carry out any desired functionality of the context-aware word embedding generation and text-to-image generation.

The computing device 400 may further include various data sources 430, or may be in communication with external data sources. Each of the databases that are included in the data sources 430 may be accessed by the various component of the disclosed system and its components.

Accordingly, the method and system may be realized in hardware, software, or a combination of hardware and software. The method and system may be realized in a centralized fashion in at least one computer system or in a distributed fashion where different elements are spread across several interconnected computer systems. Any kind of computer system or other apparatus adapted for carrying out the methods described herein may be employed.

The method and system may also be embedded in a computer program product, which includes all the features enabling the implementation of the operations described herein and which, when loaded in a computer system, is able to carry out these operations. Computer program in the present context means any expression, in any language, code or notation, of a set of instructions intended to cause a system having an information processing capability to perform a particular function, either directly or after either or both of the following: a) conversion to another language, code or notation; b) reproduction in a different material form.

Many other modifications of the implementations above may be made to adapt a particular situation or material to the teachings without departing from the scope of the current disclosure. Therefore, it is intended that the present methods and systems not be limited to the particular embodiments disclosed, but that the disclosed methods and systems include all embodiments falling within the scope of the appended claims.

I claim:

1. An automatic context-aware embedding generation system, comprising:
    a pretrained context-aware natural language processing (NLP) circuitry for generating a sentence or higher-level embedding vector of a textual input expression in a multi-dimensional embedding space, the pretrained context-aware NLP circuitry comprising a neural network having at least one hidden layer;
    a context-aware embedding generator circuitry for generating embedding vectors at a word-level; and
    a datastore for storing context-aware word-level embedding vectors,
    wherein:
        the context-aware embedding generator circuitry is configured to receive the textual input expression and request the pretrained context-aware NLP circuitry to process the textual input expression;
        the pretrained context-aware NLP circuitry is configured to automatically parse the textual input expression into a plurality of input tokens, automatically generate context-aware information items in the at least one hidden layer corresponding to the plurality of input tokens, and automatically generate the sentence or higher-level embedding vector of the input textual expression in the multi-dimensional embedding space;
        the context-aware embedding generator circuitry is further configured to automatically aggregate the context-aware information items from the at least one hidden layer to derive a set of word-level context-aware embedding vectors in the multi-dimensional embedding space for the plurality of input tokens; and
        the context-aware embedding generator circuitry is further configured to store the set of word-level context-aware embedding vectors in the multi-dimensional embedding space for the plurality of input tokens in the datastore, wherein at least one word in the datastore corresponds to two or more word-level context-aware embedding vectors.

2. The automatic context-aware embedding generation system of claim 1, wherein the context-aware embedding generator circuitry is configured to:
    obtain a plurality of reference embedding vectors of the plurality of input tokens in the multi-dimensional embedding space from a pretrained word-level reference embedding library; and
    mix the plurality of reference embedding vectors to generate the context-aware information items for the plurality of input tokens in the at least one hidden layer.

3. The automatic context-aware embedding generation system of claim 2, wherein the neural network of the context-aware embedding generator circuitry comprises at least a natural language processing model based on bidirectional encoder representations from Transformers (BERT).

4. The automatic context-aware embedding generation system of claim 2, wherein the neural network of the context-aware embedding generator circuitry comprises a combination of at least two separate NLP models.

5. The automatic context-aware embedding generation system of claim 1, further comprising a text-to-image generator circuitry and a display screen, wherein the text-to-image generator circuitry is configured to:
   automatically extract a subject token and a property token from the plurality of input tokens,
   automatically derive from the property token a property embedding vector in the multi-dimensional embedding space;
   automatically generate a textual paragraph comprising a plurality of sentences based on the subject token;
   automatically obtain, from the plurality of sentences using the context-aware embedding generator circuitry, a plurality of embedding-vector-property-token pairs, each of the plurality of embedding-vector-property-token pairs comprising:
      a context-aware embedding vector of the subject token in the multi-dimensional embedding space representing a context-aware semantics of the subject token within one of the plurality of sentences; and
      a property word associated with the context-aware embedding vector of the subject token in a context of a corresponding sentence of the plurality of sentences;
   automatically generate a realism measure of the textual input expression based on the plurality of embedding-vector-property-token pairs and the property embedding vector of the property token;
   when the realism measure is above a predefined threshold level, automatically generate a visual image from the textual input expression; and
   display the visual image on the display screen.

6. The automatic context-aware embedding generation system of claim 5, wherein the property embedding vector is derived from a pretrained word-level reference embedding library associated with the multi-dimensional embedding space or derived from the textual input expression using the pretrained context-aware embedding generator circuitry.

7. The automatic context-aware embedding generation system of claim 6, wherein the plurality of sentences of the textual paragraph each comprises the subject token and a characteristic property associated with the subject token.

8. The automatic context-aware embedding generation system of claim 7, wherein the context-aware embedding generator circuitry is configured to:
   obtain a plurality of reference embedding vectors of the plurality of input tokens in the multi-dimensional embedding space from the pretrained word-level reference embedding library; and
   mix the plurality of reference embedding vectors to generate the context-aware information items for the plurality of input tokens in the at least one hidden layer.

9. The automatic context-aware embedding generation system of claim 8, wherein the neural network of the context-aware embedding generator circuitry comprises at least a natural language processing model based on BERT.

10. The automatic context-aware embedding generation system of claim 8, wherein the neural network of the context-aware embedding generator circuitry comprises a combination of at least two separate NLP models.

11. The automatic context-aware embedding generation system of claim 5, wherein to automatically generate the realism measure of the textual input expression comprises to:
   determine whether the property token matches any of the property words in the plurality of embedding-vector-property-token pairs; and
   determine that the realism measure is above the predefined threshold level when the property token matches any of the property words in the plurality of embedding-vector-property-token pairs.

12. The automatic context-aware embedding generation system of claim 11, wherein to automatically generate the realism measure of the textual input expression further comprises to:
   compare the property embedding vector to the context-aware embedding vectors of the subject token in the plurality of embedding-vector-property-token pairs when it is determined that the property token does not match any of the property words in the plurality of embedding-vector-property-token pairs; and
   determine whether the realism measure is above the predefined threshold level by evaluating a similarity of the property embedding vector and any of the context-aware embedding vectors of the subject token in the plurality of embedding-vector-property-token pairs.

13. The automatic context-aware embedding generation system of claim 12, wherein the similarity is evaluated according to a distance between the property embedding vector and any of the context-aware embedding vectors of the subject token in the plurality of embedding-vector-property-token pairs in the multi-dimensional embedding space.

14. An automatic context-aware embedding generation method, comprising:
   receiving a textual input expression;
   automatically parsing the textual input expression into a plurality of input tokens;
   automatically generating context-aware information items corresponding to the plurality of input tokens in at least one hidden layer of a pretrained context-aware natural language processing (NLP) model configured to generate sentence or higher-level embedding vectors in a multi-dimensional embedding space;
   automatically generating a sentence-level embedding vector of the textual input expression in the multi-dimensional embedding space;
   automatically aggregating the context-aware information items from the at least one hidden layer to derive a set of word-level context-aware embedding vectors in the multi-dimensional embedding space for the plurality of input tokens; and
   storing the set of word-level context-aware embedding vectors in the multi-dimensional embedding space for the plurality of input tokens in an embedding datastore, wherein at least one word in the embedding datastore corresponds to two or more word-level context-aware embedding vectors.

15. The automatic context-aware embedding generation method of claim 14, further comprising:
   obtaining a plurality of reference embedding vectors of the plurality of input tokens in the multi-dimensional embedding space from a pretrained word-level reference embedding library; and mixing the plurality of reference embedding vectors to generate the context-aware information items for the plurality of input tokens in the at least one hidden layer.

16. The automatic context-aware embedding generation method of claim 14, further comprising:
    automatically extracting a subject token and a property token from the plurality of input tokens,
    automatically deriving from the property token a property embedding vector in the multi-dimensional embedding space;
    automatically generating a textual paragraph comprising a plurality of sentences based on the subject token;
    automatically obtaining, from the plurality of sentences using the pretrained context-aware NLP model, a plurality of embedding-vector-property-token pairs, each of the plurality of embedding-vector-property-token pairs comprising:
        a context-aware embedding vector of the subject token in the multi-dimensional embedding space representing a context-aware semantics of the subject token within one of the plurality of sentences; and
        a property word associated with the context-aware embedding vector of the subject token in a context of a corresponding sentence of the plurality of sentences;
    automatically generating a realism measure of the textual input expression based on the plurality of embedding-vector-property-token pairs and the property embedding vector of the property token;
    when the realism measure is above a predefined threshold level, automatically generating a visual image from the textual input expression; and
    displaying the visual image on a display screen.

17. The automatic context-aware embedding generation method of claim 16, wherein the property embedding vector is derived from a pretrained word-level reference embedding library associated with the multi-dimensional embedding space or derived from the textual input expression using the pretrained context-aware NLP model.

18. The automatic context-aware embedding generation method of claim 16, further comprising:
    obtaining a plurality of reference embedding vectors of the plurality of input tokens in the multi-dimensional embedding space from a pretrained word-level reference embedding library; and
    mixing the plurality of reference embedding vectors to generate the context-aware information items for the plurality of input tokens in the at least one hidden layer.

19. The automatic context-aware embedding generation method of claim 16, wherein automatically generating the realism measure of the textual input expression comprises:
    determining whether the property token matches any of the property words in the plurality of embedding-vector-property-token pairs; and
    determining that the realism measure is above the predefined threshold level when the property token matches any of the property words in the plurality of embedding-vector-property-token pairs.

20. The automatic context-aware embedding generation method of claim 19, wherein automatically generating the realism measure of the textual input expression further comprises:
    comparing the property embedding vector to the context-aware embedding vectors of the subject token in the plurality of embedding-vector-property-token pairs when it is determined that the property token does not match any of the property words in the plurality of embedding-vector-property-token pairs; and
    determining whether the realism measure is above the predefined threshold level by evaluating a similarity of the property embedding vector and any of the context-aware embedding vectors of the subject token in the plurality of embedding-vector-property-token pairs.

* * * * *